(12) United States Patent
Zhang et al.

(10) Patent No.: US 10,746,223 B2
(45) Date of Patent: Aug. 18, 2020

(54) PROTECTIVE STRUCTURE FOR MAGNETIC BEARING AND MAGNETIC BEARING ASSEMBLY

(71) Applicant: Gree Green Refrigeration Technology Center Co., Ltd. of Zhuhai, Zhuhai (CN)

(72) Inventors: Fang Zhang, Zhuhai (CN); Yusheng Hu, Zhuhai (CN); Xiaobo Zhang, Zhuhai (CN); Jianning Liu, Zhuhai (CN); Gao Gong, Zhuhai (CN); Chao Zhang, Zhuhai (CN); Siyuan Tian, Zhuhai (CN); Jiuzhan Su, Zhuhai (CN); Jinxin Jia, Zhuhai (CN); Changguang Guo, Zhuhai (CN); Guanghai Li, Zhuhai (CN)

(73) Assignee: Gree Green Refrigeration Technology Center Co., Ltd. of Zhuhai, Zhuhai (CN)

( * ) Notice: Subject to any disclaimer, the term of this patent is extended or adjusted under 35 U.S.C. 154(b) by 65 days.

(21) Appl. No.: 16/318,186

(22) PCT Filed: Feb. 17, 2017

(86) PCT No.: PCT/CN2017/073924
§ 371 (c)(1),
(2) Date: Jan. 16, 2019

(87) PCT Pub. No.: WO2018/032739
PCT Pub. Date: Feb. 22, 2018

(65) Prior Publication Data
US 2019/0234460 A1    Aug. 1, 2019

(30) Foreign Application Priority Data

Aug. 15, 2016 (CN) .......................... 2016 1 0671171

(51) Int. Cl.
*F16C 32/04* (2006.01)
*H02K 7/10* (2006.01)
*H02K 7/09* (2006.01)

(52) U.S. Cl.
CPC .......... *F16C 32/0402* (2013.01); *F16C 32/04* (2013.01); *F16C 32/047* (2013.01);
(Continued)

(58) Field of Classification Search
CPC ........ H02K 7/09; H02K 7/10; F16C 2380/26; F16C 32/04; F16C 32/0402; F16C 32/047; F16C 32/0474; F16C 32/0476
(Continued)

(56) References Cited

U.S. PATENT DOCUMENTS 5,272,403 A    12/1993 New
5,739,609 A    4/1998 Ueyama et al.
(Continued)

FOREIGN PATENT DOCUMENTS

| CN | 105570291 A | 5/2016 |
| CN | 105570292 A | 5/2016 |
| CN | 106151272 A | 11/2016 |
| CN | 206000857 U | 3/2017 |
| JP | 475195 U | 6/1992 |
| JP | 11193820 A | 7/1999 |
| JP | 200973473 A | 4/2009 |

*Primary Examiner* — Tulsidas C Patel
*Assistant Examiner* — Rashad H Johnson
(74) *Attorney, Agent, or Firm* — The Webb Law Firm

(57) ABSTRACT

The present invention provides a protective structure for a magnetic bearing and a magnetic bearing assembly. The protective structure for a magnetic bearing comprises: a first radial bearing protective component, sleeved on a shaft and in a position corresponding to a magnetic bearing, a first gap being radially formed between the first radial bearing protective component and the shaft; and a second radial bearing protective component, sleeved on the shaft and in a position corresponding to the magnetic bearing, a second gap being radially formed between the second radial bearing protective component and the shaft; the height of a working gap being
(Continued)

greater than the height of the second gap, the height of the second gap being greater than the height of the first gap. The protective structure for the magnetic bearing and the magnetic bearing assembly effectively solve the problem of lower security between a magnetic bearing and a shaft, since a protective structure for the magnetic bearing is prone to failure in the prior art.

8 Claims, 3 Drawing Sheets

(52) U.S. Cl.
CPC ...... *F16C 32/0474* (2013.01); *F16C 32/0476* (2013.01); *H02K 7/09* (2013.01); *H02K 7/10* (2013.01)

(58) Field of Classification Search
USPC ..... 310/90.5; 384/107, 115, 190.5, 204, 231
See application file for complete search history.

(56) References Cited

U.S. PATENT DOCUMENTS

| | | | |
|---|---|---|---|
| 6,359,357 B1* | 3/2002 | Blumenstock | F16C 32/0465 310/90.5 |
| 2011/0085753 A1* | 4/2011 | Tecza | F16C 39/02 384/462 |
| 2013/0207495 A1 | 8/2013 | De Lepine | |
| 2014/0254962 A1* | 9/2014 | Tecza | F16C 32/0402 384/91 |
| 2014/0334755 A1* | 11/2014 | Krebs | F16C 39/02 384/322 |
| 2015/0260221 A1* | 9/2015 | Anders | F01D 25/168 384/448 |
| 2016/0123388 A1* | 5/2016 | Falomi | F16C 39/02 310/90.5 |

\* cited by examiner

PROTECTIVE STRUCTURE FOR MAGNETIC BEARING AND MAGNETIC BEARING ASSEMBLY

CROSS-REFERENCE TO RELATED APPLICATIONS

This application is the United States national phase of International Application No. PCT/CN2017/073924 filed Feb. 17, 2017, and claims priority to Chinese Patent Application No. 201610671171.6 filed Aug. 15, 2016, the disclosures of which are hereby incorporated in their entirety by reference.

BACKGROUND OF THE INVENTION

Field of the Invention

The present disclosure relates to the field of bearing technology, in particular to a protective structure for a magnetic bearing and a magnetic bearing assembly.

Description of Related Art

In the prior art, a protective structure for a high-speed magnetic bearing, as shown in FIG. 1, includes an shaft 10', a magnetic bearing 20' (comprising a bearing control coil and a bearing iron core), and a ball bearing 30'. The ball bearing 30' is used for forming a first-level radial protective structure for the magnetic bearing, a limiting gap is formed between the ball bearing 30' and the shaft 10', and the limiting gap is smaller than a working gap between the bearing iron core of the magnetic bearing and the shaft. In the case of rotation instability of the shaft, the shaft is in frictional contact with the ball bearing. Therefore, the bearing iron core of the magnetic bearing is protected from ablation and damage due to the friction with the shaft. However, when the ball bearing is worn at the same time, the bearing iron core is directly in contact with the shaft, the contact area between the magnetic bearing and the shaft is damaged at a large rotational speed, and thus cannot be used again. In summary, the protective structure for the magnetic bearing in the prior art is prone to failure, resulting in lower safety between the magnetic bearing and the shaft.

SUMMARY OF THE INVENTION

In the embodiment of the present invention, a protective structure for a magnetic bearing and a magnetic bearing assembly are provided to solve the problem that the protective structure for the magnetic bearing in the prior art is prone to failure, resulting in lower safety between the magnetic bearing and a shaft.

In order to solve the above technical problem, the present invention provides a protective structure for a magnetic bearing for protecting the magnetic bearing on a shaft from generating friction with the shaft, and a working gap is formed between a bearing iron core of the magnetic bearing and the shaft along the radial direction. The protective structure includes: a first radial bearing protective component, sleeved on the shaft and corresponding to the position of the magnetic bearing, and a first gap is formed between the first radial bearing protective component and the shaft along the radial direction; and a second radial bearing protective component, sleeved on the shaft and corresponding to the position of the magnetic bearing, and a second gap is formed between the second radial bearing protective component and the shaft along the radial direction; and the height of the working gap is greater than the height of the second gap, and the height of the second gap is greater than the height of the first gap.

Further, the protective structure further includes a third radial bearing protective component, sleeved on the shaft and corresponding to the position of the magnetic bearing, a third gap is formed between the third radial bearing protective component and the shaft along the radial direction, the height of the third gap is greater than the height of the second gap, and the height of the third gap is less than the height of the working gap.

Further, the third radial bearing protective component is an anti-collision ring or a ball bearing.

Further, the first radial bearing protective component is an anti-collision ring or a ball bearing, and the second radial bearing protective component is an anti-collision ring or a ball bearing.

Further, the first radial bearing protective component is a ball bearing, the second radial bearing protective component is an anti-collision ring, and the anti-collision ring is integrated on a gland of the ball bearing.

Further, the protective structure further includes a first sleeve, the first sleeve is detachably sleeved on the shaft, and the first radial bearing protective component and the second radial bearing protective component are both arranged at the first sleeve, the first gap is formed between an inner ring surface of the first radial bearing protective component and an outer ring surface of the first sleeve, and the second gap is formed between the inner ring surface of the second radial bearing protective component and the outer ring surface of the first sleeve.

Further, the protective structure further includes a second sleeve, the second sleeve is detachably sleeved on the shaft, and the first radial bearing protective component, the second radial bearing protective component and the third radial bearing protective component are arranged at the second sleeve; the first gap is formed between the inner ring surface of the first radial bearing protective component and the outer ring surface of the second sleeve, the second gap is formed between the inner ring surface of the second radial bearing protective component and the outer ring surface of the second sleeve, and the third gap is formed between the inner ring surface of the third radial bearing protective component and the outer ring surface of the second sleeve.

Further, the first radial bearing protective component, the second radial bearing protective component and the third radial bearing protective component are sequentially arranged in a direction away from the bearing iron core of the magnetic bearing.

According to another aspect of the present invention, a magnetic bearing assembly is provided, including a magnetic bearing installed on a shaft, and a protective structure for the magnetic bearing, and the protective structure of the magnetic bearing is the protective structure for the magnetic bearing mentioned above.

By application of the technical solution of the present invention, the magnetic bearing on the high-speed rotating shaft is protected, and the protective structure of the magnetic bearing is provided with the first radial bearing protective component and the second radial bearing protective component to increase the levels of the protective structure and to form two-level wear resistance. In the case of rotation instability of the shaft, the shaft is in frictional contact with the first radial bearing protective component, so that the first radial bearing protective component forms the first-level protection. When the first radial bearing protective component fails, the shaft is in frictional contact with the second radial bearing protective component, so that the second radial bearing protective component forms second-level protection, thereby forming multi-level safety guarantee for the magnetic bearing, improving the reliability of the protective structure for the magnetic bearing, avoiding the potential safety hazard problem of the shaft after the ball bearing is damaged in the prior art, and improving the safety between the magnetic bearing and the shaft.

REFERENCE SIGNS 10, shaft; 20, magnetic bearing; 21, working gap; 31, first radial bearing protective component; 32, second radial bearing protective component; 33, third radial bearing protective component; 41, first gap 42, second gap; 43, third gap; 51, first sleeve; 52, second sleeve.

DESCRIPTION OF THE INVENTION

The present invention will be further described in detail below with reference to the accompanying drawings and specific embodiments, but the present invention is not limited thereto.

Figure 1:
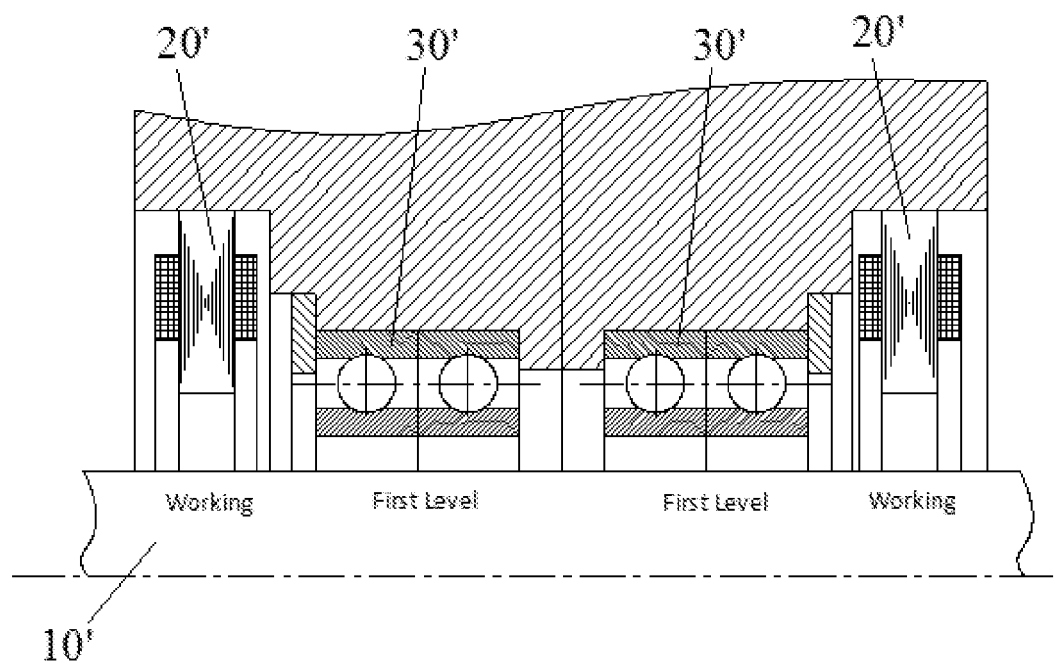
FIG. 1 is a structural schematic diagram of a protective structure for a magnetic bearing in the prior art.
Figure 2:
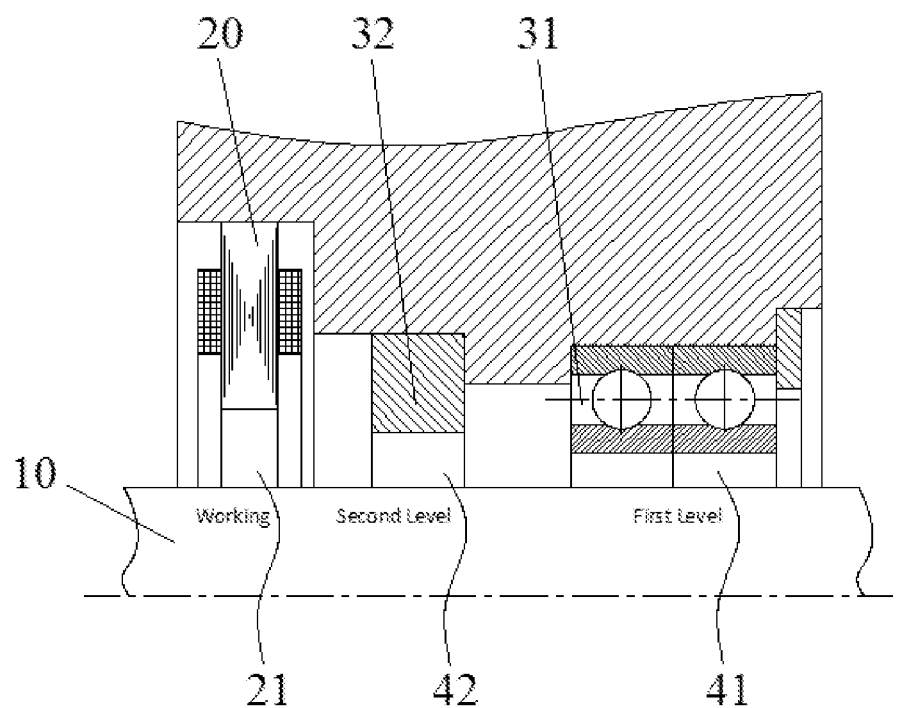
FIG. 2 is a structural schematic diagram of a protective structure for a magnetic bearing in a first embodiment of the present invention.

As shown in FIG. 2, according to a first embodiment of the present invention, a protective structure for a magnetic bearing is provided to protect a magnetic bearing 20 on an shaft 10 from generating friction with the shaft 10, a working gap 21 is formed between a bearing iron core of the magnetic bearing 20 and the shaft 10. The protective structure includes a first radial bearing protective component 31 and a second radial bearing protective component 32. The first radial bearing protective component 31 is sleeved on the shaft 10 and corresponds to the position of the magnetic bearing 20, and a first gap 41 is formed between the first radial bearing protective component 31 and the shaft 10 along the radial direction. The second radial bearing protective component 32 is sleeved on the shaft 10 and corresponds to the position of the magnetic bearing 20, a second gap 42 is formed between the second radial bearing protective component 32 and the shaft 10 along the radial direction. The height of the working gap 21 is greater than the height of the second gap 42, and the height of the second gap 42 is greater than the height of the first gap 41.

It should be noted that the height of the working gap 21 is the distance between an inner ring surface of the bearing iron core and an outer surface of the shaft, the height of the first gap 41 is the distance between the inner ring surface of the first radial bearing protective component 31 and the outer surface of the shaft, and the height of the second gap 42 is the distance between the inner ring surface of the second radial bearing protective component 32 and the outer surface of the shaft.

In the technical solution, the magnetic bearing on the high-speed rotating shaft is protected, and the protective structure for the magnetic bearing is provided with the first radial bearing protective component 31 and the second radial bearing protective component 32 to increase the levels of the protective structure and to form two-level wear resistance. In the case of rotation instability of the shaft, the shaft is in frictional contact with the first radial bearing protective component 31, so that the first radial bearing protective component 31 forms the first-level protection. When the first radial bearing protective component 31 fails, the shaft is in frictional contact with the second radial bearing protective component 32, so that the second radial bearing protective component 32 forms second-level protection, thereby forming multi-level safety guarantee for the magnetic bearing, improving the reliability of the protective structure for the magnetic bearing, avoiding the potential safety hazard problem of the shaft after the ball bearing is damaged in the prior art, and improving the safety between the magnetic bearing and the shaft.

The first radial bearing protective component 31 is an anti-collision ring or a ball bearing, and the second radial bearing protective component 32 is an anti-collision ring or a ball bearing. The first radial bearing protective component 31 and the second radial bearing protective component 32 can be in any one of the above two structures. In the embodiment as shown in FIG. 2, the first radial bearing protective component 31 is a ball bearing, the second radial bearing protective component 32 is an anti-collision ring, and the second radial bearing protective component 32 is arranged on one side of the first radial bearing protective component 31 close to the magnetic bearing.

Figure 3:
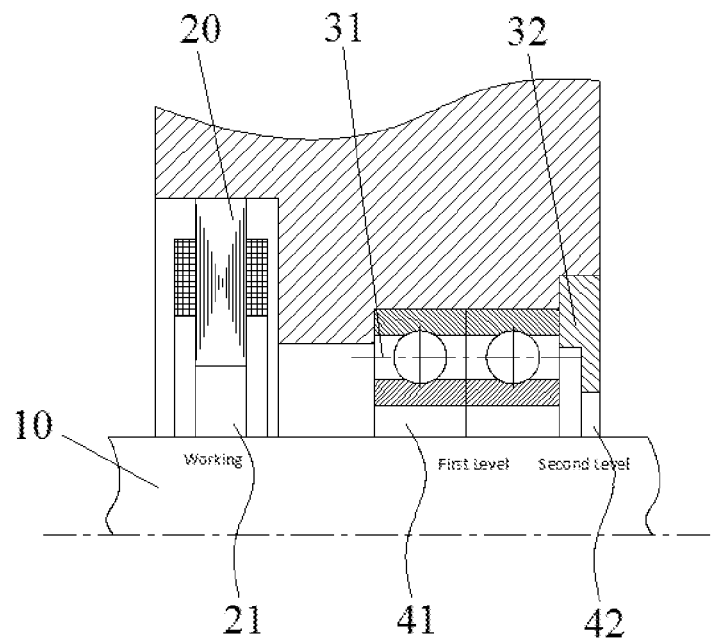
FIG. 3 is a structural schematic diagram of a protective structure for a magnetic bearing in a second embodiment of the present invention.

As shown in FIG. 3, according to a second embodiment of the present invention, a protective structure for a magnetic bearing is provided. The protective structure of the magnetic bearing of the present embodiment is similar to that of the above embodiment. Their difference lies in the structures of the first radial bearing protective component 31 and the second radial bearing protective component 32. In the present embodiment, the first radial bearing protective component 31 is a ball bearing, the second radial bearing protective component 32 is an anti-collision ring, and the anti-collision ring is integrated on a gland of the ball bearing. In the present embodiment, the anti-collision ring is integrated on the gland of the ball bearing, so that the production cost can be reduced. Moreover, the anti-collision ring is easy to process and disassemble, it is easy to adjust the size of the gap, the assembly flexibility is improved, and the product qualification rate is improved.

Figure 4:
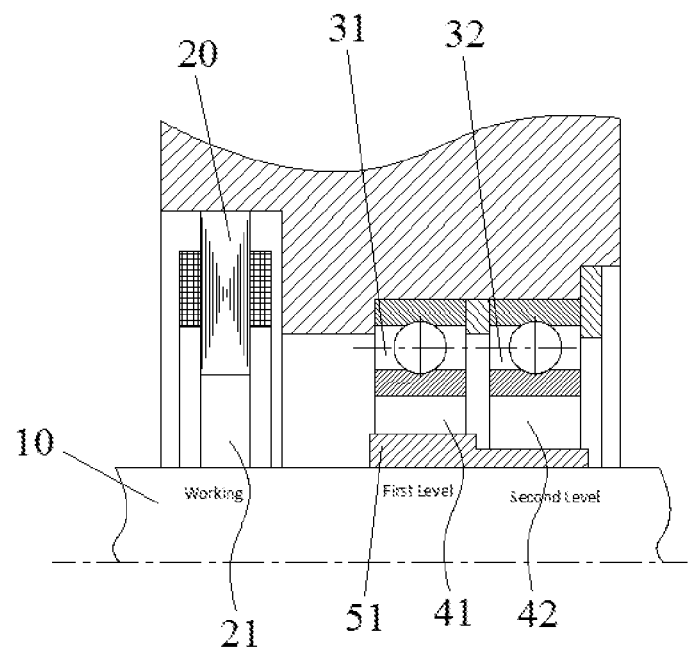
FIG. 4 is a structural schematic diagram of a protective structure for a magnetic bearing in a third embodiment of the present invention.

As shown in FIG. 4, according to a third embodiment of the present invention, a protective structure for a magnetic bearing is provided. The protective structure of the magnetic bearing of the present embodiment is similar to that of the above embodiment. Their difference lies in that, in the present embodiment, the protective structure further includes a first sleeve 51, the first sleeve 51 is detachably sleeved on the shaft 10, the first radial bearing protective component 31 and the second radial bearing protective component 32 are both arranged at the first sleeve 51, a first gap 41 is formed between the inner ring surface of the first radial bearing protective component 31 and the outer ring surface of the first sleeve 51, and a second gap 42 is formed between the inner ring surface of the second radial bearing protective component 32 and the outer ring surface of the first sleeve 51. With reference to the shape of the first sleeve 51 shown in FIG. 4, the heights of the first gap 41 and the second gap 42 can be changed by changing the outer diameters at different positions of the first sleeve 51, such that two-level protection gaps (the first gap and the second gap) can be changed by adjusting the outer diameter of the first sleeve. Therefore, it is easier to adjust the height of the protection gap, the dependence on the assembly precision and the processing precision is reduced, the assembly difficulty can be reduced, the assembly time can be shortened, and the production efficiency can be improved.

Figure 5:
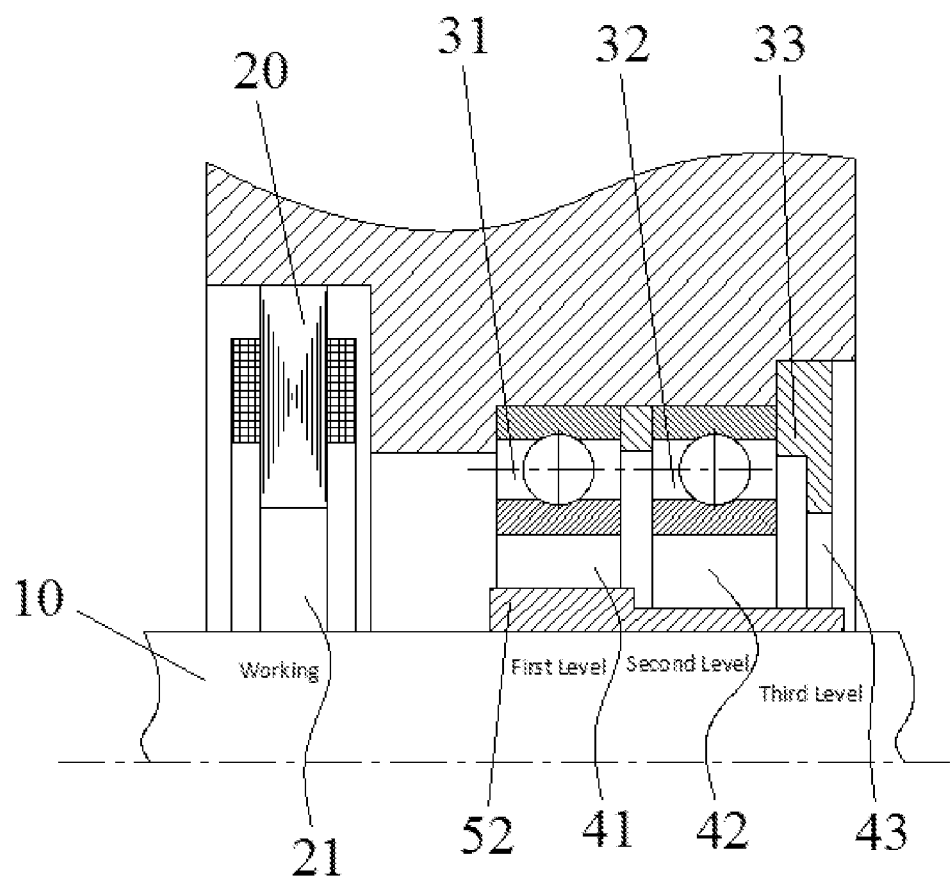
FIG. 5 is a structural schematic diagram of a protective structure for a magnetic bearing in a fourth embodiment of the present invention.

As shown in FIG. 5, according to a fourth embodiment of the present invention, a protective structure for a magnetic bearing is provided. The protective structure of the magnetic bearing of the present embodiment is similar to that of the above embodiment. Their difference lies in that, in the present embodiment, the protective structure further includes a third radial bearing protective component 33 that is sleeved on the shaft 10 and corresponds to the position of the magnetic bearing 20, a third gap 43 is formed between the third radial bearing protective component 33 and the shaft 10 along the radial direction, the height of the third gap 43 is greater than the height of the second gap 42, and the height of the third gap 43 is less than the height of the working gap 21.

As shown in FIG. 5, the protective structure of the present embodiment is provided with the first radial bearing protective component 31, the second radial bearing protective component 32 and the third radial bearing protective component 33 to increase the levels of the protective structure and to form three-level wear resistance. The multi-level protection principle is similar to that in the first embodiment, and multi-level safety guarantee is formed for the magnetic bearing, thereby improving the reliability of the protective structure for the magnetic bearing, avoiding the potential safety hazard problem of the shaft after the ball bearing is damaged in the prior art, and improving the safety between the magnetic bearing and the shaft.

The third radial bearing protective component 33 has the same structural configuration as the first radial bearing protective component 31 and the second radial bearing protective component 32, and the third radial bearing protective component 33 is an anti-collision ring or a ball bearing. In the present embodiment, the first radial bearing protective component 31 and the second radial bearing protective component 32 are both ball bearings, and the third radial bearing protective component 33 is an anti-collision ring. At the same time, the first radial bearing protective component 31, the second radial bearing protective component 32 and the third radial bearing protective component 33 are sequentially arranged along a direction away from the bearing iron core of the magnetic bearing 20.

Further preferably, in the present embodiment, the protective structure further includes a second sleeve 52, the second sleeve 52 is detachably sleeved on the shaft 10, and the first radial bearing protective component 31, the second radial bearing protective component 32 and the third radial bearing protective component 33 are all arranged at the second sleeve 52.

A first gap 41 is formed between the inner ring surface of the first radial bearing protective component 31 and the outer ring surface of the second sleeve 52, a second gap 42 is formed between the inner ring surface of the second radial bearing protective component 32 and the outer ring surface of the second sleeve 52, and a third gap 43 is formed between the inner ring surface of the third radial bearing protective component 33 and the outer ring surface of the second sleeve 52.

With reference to the shape of the second sleeve 52 shown in FIG. 5, the heights of the first gap 41, the second gap 42 and the third gap 43 can be changed by changing the outer diameters at different positions of the second sleeve 52, such that three-level protection gaps can be changed by adjusting the outer diameter of the second sleeve 52. Therefore, it is easier to adjust the height of the protection gap, the dependence on the assembly precision and the processing precision is reduced, the assembly difficulty can be reduced, the assembly time can be shortened, and the production efficiency can be improved.

In addition, the present invention further provides an embodiment of a magnetic bearing assembly. The magnetic bearing assembly of the present embodiment includes a magnetic bearing installed on a shaft and a protective structure for the magnetic bearing, and the protective structure for the magnetic bearing is the protective structure for the magnetic bearing in the above embodiment.

It should be noted that the terms used herein are for the purpose of describing specific embodiments only and are not intended to limit the exemplary embodiments according to the present applications. As used herein, the singular forms are also intended to include the plural forms, unless the context clearly indicates otherwise, and it is also be understood that, when the terms "comprise" and/or "include" are used in the specification, they indicate the presence of features, steps, operations, devices, components, and/or combinations thereof.

It should be noted that the terms "first", "second" and the like in the specification, claims and drawings of the present application are used for distinguishing similar objects, and are not necessarily used for describing a specific sequence or order. It should be understood that the data used herein may be interchanged where appropriate, so that the embodiments of the present application described herein can be implemented in a sequence other than those illustrated or described herein.

Of course, the above description is a preferred embodiment of the present invention. It should be noted that, those of ordinary skill in the art can make several modifications and improvements without departing from the basic principles of the present invention, and these modifications and improvements should also be considered as the scope of protection of the present invention.

The invention claimed is:

1. A magnetic bearing assembly comprising a shaft, a magnetic bearing installed on the shaft, and a protective structure for a magnetic bearing, for protecting the magnetic bearing on a shaft from generating friction with the shaft, a working gap being formed between a bearing iron core of the magnetic bearing and the shaft along the radial direction, wherein the protective structure comprises:
   a first radial bearing protective component, sleeved on the shaft and corresponding to the position of the magnetic bearing, wherein a first gap is formed between the first radial bearing protective component and the shaft along the radial direction; and
   a second radial bearing protective component, sleeved on the shaft and corresponding to the position of the magnetic bearing, wherein a second gap is formed between the second radial bearing protective component and the shaft along the radial direction; and the height of the working gap is greater than the height of the second gap, and the height of the second gap is greater than the height of the first gap.

2. The magnetic bearing assembly according to claim 1, wherein the protective structure further comprises a third radial bearing protective component, sleeved on the shaft and corresponding to the position of the magnetic bearing, and a third gap is formed between the third radial bearing protective component and the shaft along the radial direction, the height of the third gap is greater than the height of the second gap, and the height of the third gap is less than the height of the working gap.

3. The magnetic bearing assembly according to claim 2, wherein the third radial bearing protective component is an anti-collision ring or a ball bearing.

4. The magnetic bearing assembly according to claim 2, wherein the protective structure further comprises a second sleeve, and the second sleeve is detachably sleeved on the shaft, and the first radial bearing protective component, the second radial bearing protective component and the third radial bearing protective component are arranged on the second sleeve; and the first gap is formed between the inner ring surface of the first radial bearing protective component and the outer ring surface of the second sleeve, the second gap is formed between the inner ring surface of the second radial bearing protective component and the outer ring surface of the second sleeve, and the third gap is formed between the inner ring surface of the third radial bearing protective component and the outer ring surface of the second sleeve.

5. The magnetic bearing assembly according to claim 2, wherein the first radial bearing protective component, the second radial bearing protective component and the third radial bearing protective component are sequentially arranged in a direction away from the bearing iron core of the magnetic bearing.

6. The magnetic bearing assembly according to claim 1, wherein the first radial bearing protective component is an anti-collision ring or a ball bearing, and the second radial bearing protective component is an anti-collision ring or a ball bearing.

7. The magnetic bearing assembly according to claim 1, wherein the first radial bearing protective component is a ball bearing, the second radial bearing protective component is an anti-collision ring, and the anti-collision ring is integrated on a gland of the ball bearing.

8. The magnetic bearing assembly according to claim 1, wherein the protective structure further comprises a first sleeve, wherein the first sleeve is detachably sleeved on the shaft, and the first radial bearing protective component and the second radial bearing protective component are both arranged at the first sleeve, the first gap is formed between an inner ring surface of the first radial bearing protective component and an outer ring surface of the first sleeve, and the second gap is formed between the inner ring surface of the second radial bearing protective component and the outer ring surface of the first sleeve.

* * * * *